Sept. 23, 1969    K. HAVLÍČEK ET AL    3,469,233
FLASHER AND TURN INDICATOR CIRCUIT FOR VEHICLE
AND SELECTOR SWITCH THEREFOR
Filed March 31, 1966    2 Sheets-Sheet 1

INVENTORS
Karel Havlíček, Alois Košťal
BY
Richard Low
agt

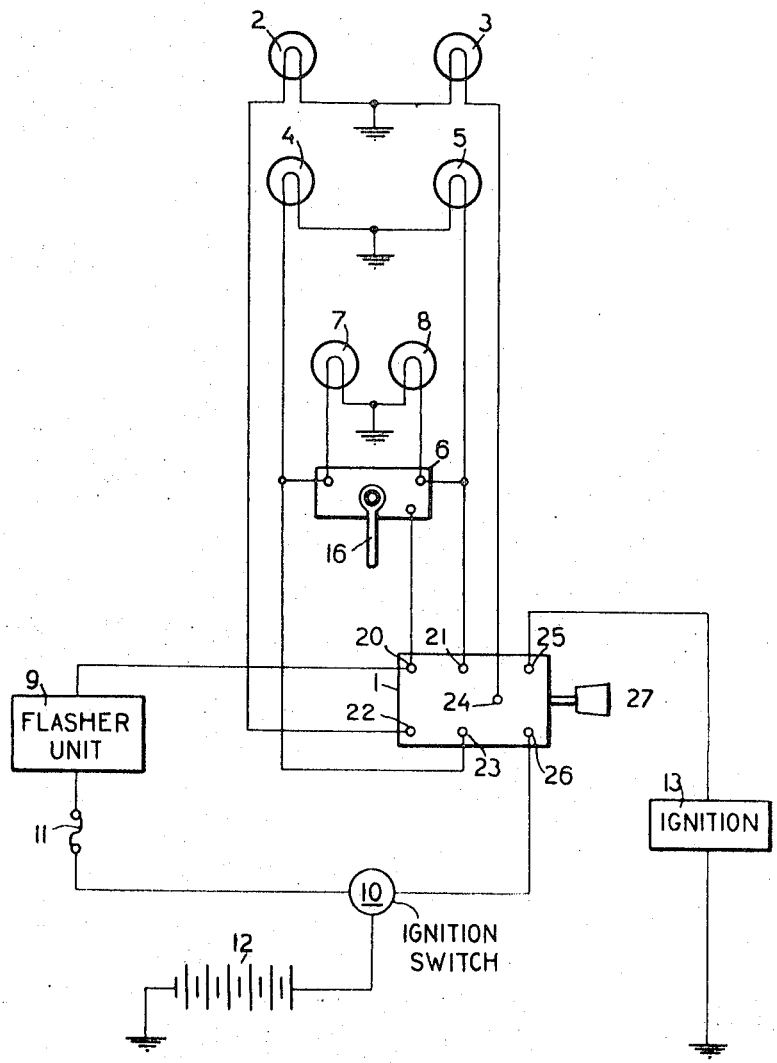

United States Patent Office 3,469,233
Patented Sept. 23, 1969

3,469,233
FLASHER AND TURN INDICATOR CIRCUIT FOR VEHICLE AND SELECTOR SWITCH THEREFOR
Karel Havlicek and Alois Kostal, Prague, Czechoslovakia, assignors to PAL, narodni podnik, Koely u Prahy, Czechoslovakia
Filed Mar. 31, 1966, Ser. No. 539,171
Claims priority, application Czechoslovakia, July 22, 1965, 4,666/65, 4,683/65
Int. Cl. B60q 1/52, 1/34
U.S. Cl. 340—81        7 Claims

ABSTRACT OF THE DISCLOSURE

A selector switch comprises a contact operatively connected to a control member and engageable with at least five contacts for selectively connecting first and fifth contacts in a first position of the control member. In a second position of the control member, second, third and fourth contacts are selectively connected. The first and fifth contacts are connected in the third position of the control member while the connection between the second, third and fourth contacts is maintained.

---

This invention relates to an emergency signal arrangement for automobiles and like vehicles operated by an engine which is electrically operated or electrically controlled, and particularly to a circuit for generating a visible emergency signal and to a selector switch for controlling the circuit.

It is common practice to equip passenger automobiles, trucks, and other road vehicles with lights which can be connected with a power source such as a storage battery through a flasher unit to generate a visible emergency signal different from the usual brake or turn-indicating signals. The simultaneous flashing of all turn-indicating lights on the vehicle is normally relied upon for making a stopped vehicle in or near a traffic lane conspicuous to other users of the road.

An object of the invention is the provision of a circuit for flashing warning lights on a stopped motor vehicle which can be operated for a long period on the current of an available battery.

A more specific object is the provision of such a circuit which flashes both rear turn-indicator lights only so as to conserve battery power and not to overload the flashing unit, thus permitting the emergency signal arrangement to be installed in cars equipped with an existing conventional flasher unit of adequate capacity for flashing the front and rear lights on one side of the car only, but overtaxed when called upon to flash more than two lights.

Another object is the provision of an emergency signal circuit which cannot normally be operated as long as the engine is running, thereby preventing other drivers from being confused by a vehicle moving in normal operation with its emergency lights flashing.

A further object is the provision of an emergency flashing circuit which permits testing of the engine or other brief operation of the engine with the lights flashing without loss of the safety feature referred to in the preceding paragraph.

An additional object is the provision of a single selector switch arranged in the flashing and ignition circuits and having a control member which is to be moved in unmistakably different ways for switching between the various control positions.

With these and other objects in view, the invention in part resides in a circuit for generating a visible emergency signal which is provided with a selector switch having at least five fixed contacts of which a first one is connected to a source of electric current. A flasher unit is conductively interposed between the source and a second contact of the switch. The third and fourth contacts are respectively connected to two signal lights, and the fifth contact may be connected to the ignition system of the vehicle.

The selector switch has a control member such as a knob which can be moved between three positions and movable contacts connected with the control member and engageable with the aforementioned five contacts in such a manner that only the first and fifth contacts are connected in a first position of the control member; the second, third, and fourth contacts are conductively connected in the second control member position; and the first and fifth contacts are connected while the connection between the second, third, and fourth contacts is maintained when the control member is moved from the second into the third position. A biasing spring permanently urges the control member from the third toward the second position.

An additional pair of signal lights can be separately controlled when the selector switch is equipped with sixth and seventh fixed contacts respectively connected by the movable contacts to the third and fourth contacts in the first position of the control member only. A conventional turn-indicator switch, which is normally a single-pole double-throw switch interposed between the flasher unit and the two first-mentioned signal lights can then be manually operated with the usual results as long as the selector switch is in its first position.

The control knob is mounted on a shaft which is rotatable and axially slidable in the casing of the selector switch, the fixed and movable contacts being arranged in such a manner that the knob is guided by the shaft and casing for angular movement between its first and second positions, and for axial sliding movement between the second and third positions.

The terms "fixed contact," "movable contact," and "movable control member" are being used in this specification for the convenience of description only, and it will be understood that they do not establish a relationship between the contacts or the control knob and any specific reference system such as the body of the motor vehicle. The afore-described contacts and the control member may thus be fixedly fastened to the vehicle body, and the "fixed" contacts may be rotated or axially shifted relative to the "movable" elements without departing from the scope of the invention.

It will further be assumed throughout the specification that all circuit elements and one pole of the current source are grounded to the vehicle body or to another common return lead as is conventional in this art, unless otherwise specifically stated or shown in the drawing, and such return connections will not be described in detail. They are indicated in the drawing by conventional symbols.

The exact nature of this invention as well as other objects and advantages thereof will be readily apparent from consideration of the following detailed description of a preferred embodiment relating to the annexed drawing in which:

FIG. 3 is a diagram of the signal circuit employing the switch of FIGS. 1 and 2.

Figure 1:
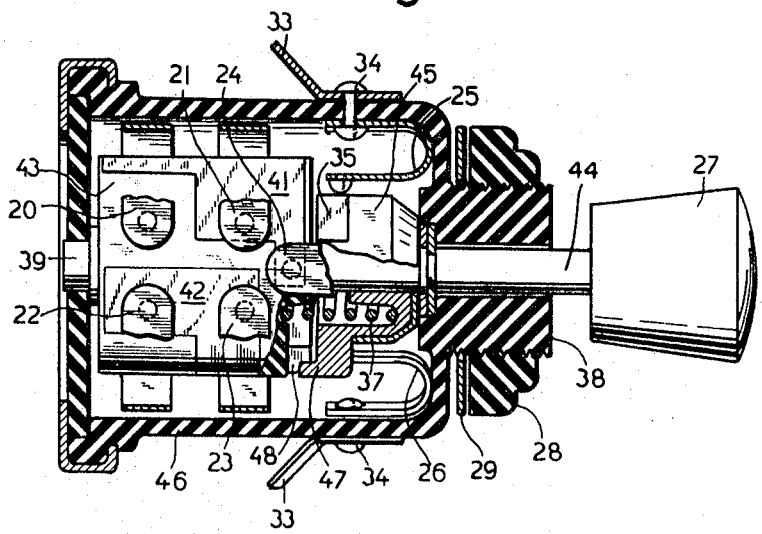
FIG. 1 shows a selector switch for the emergency signal circuit of the invention, the switch being shown in side elevation and partly in section, mainly on its axis.
Figure 2:
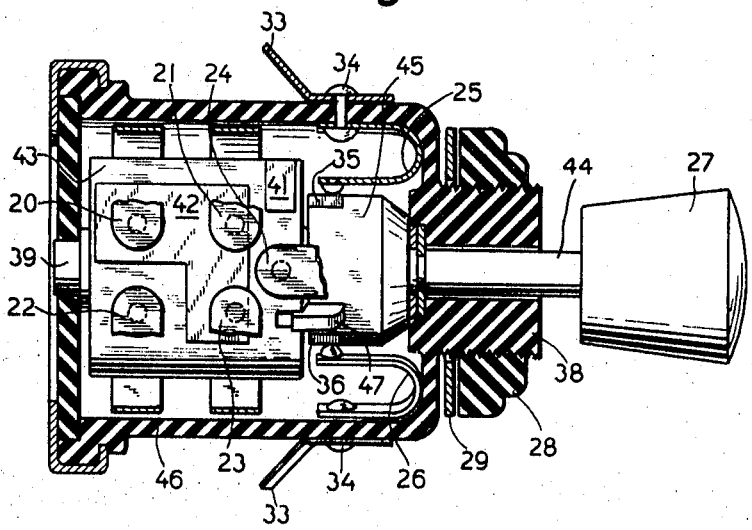
FIG. 2 shows the switch of FIG. 1 in a different operating position.

Referring now to the drawing in detail, and initially to FIGS. 1 and 2, there is shown a selector switch having a casing 46 of insulating material which is of generally circular cross section. A main switch drum 43 is coaxially journaled in the casing 46 on a shaft 39. The cylindrical surface of the drum also consists of insulating material and carries two inserted metal segments 41, 42 which are spaced from each other.

A shaft 44 coaxial with the drum 43 passes through a neck portion 38 of the casing 46 in rotatable and axially slidable engagement. The end of the shaft 44 outside the casing 46 carries a knob 27 and the inner end of the shaft 44 carries an auxiliary switch drum 45. A helical compression spring 37 axially interposed between the drums 43 and 45 holds the drum 43 in a fixed axial position relative to the casing 46 and urges the shaft 44 to move outward of the casing until the auxiliary drum 45 abuts against the neck portion 38. The latter is externally threaded and carries a nut 28 and washer 29 by means of which the casing 46 is normally attached to the dashboard of a car with the shaft 44 passing through an opening in the same.

The drums 43, 45 cooperate with seven fixed contacts 20–26 on the casing 46. The contacts 20–24 are mounted on that portion of the casing 46 which is broken away in the views of FIGS. 1 and 2, the arrangement being the same as illustrated with respect to contacts 25, 26 each of which is attached to the inner wall of the casing 46 by a rivet 34 to which a soldering lug 33 on the outside of the casing is conductively secured.

The auxiliary drum 45 consists mainly of metal and carries two small plates 35, 36 of insulating material which are inserted into the cylindrical drum surface. An integral claw 47 on the auxiliary drum 45 engages a notch 48 in the main drum 43 to provide a claw coupling which permits relative axial movement of the drums, but permanently couples them for joint rotation.

Abutments, conventional in themselves and not visible in FIGS. 1 and 2, limit the joint rotary movement of the knob 27, the shaft 44, and the drums 43, 45 to an angle of about 45°, the terminal angular positions being respectively illustrated in FIGS. 1 and 2.

As shown in FIGS. 1, the segment 41 conductively connects the fixed contacts 21 and 24. The segment 42 connects the contacts 22 and 23, and the auxiliary drum 45 connects the contacts 25, 26. The contact 20 engages the insulating surface of the drum 43.

In the swtich position illustrated in FIG. 2, the segment 41 is out of range of all fixed contacts. The segment 42 connects the contacts 20, 21 and 23. The contacts 22, 24 engage insulating surface portions of the drum 43, and the contacts 25, 26 respectively engage the insulating plates 35, 36.

When the knob 27 is moved axially toward the drum 43 against the restraint of the spring 37 while in the angular position of FIG. 2, the resulting movement of the drum 45 causes the contacts 25, 26 to be disengaged from the plates 35, 36 and to be conductively connected by the metal surface of the drum 45.

The selector switch illustrated in FIGS. 1 and 2 is indicated at 1 in the circuit diagram of FIG. 3 which illustrates as much of the electrical circuit of a motor car as is relevant to this invention. The front turn-indicator lights 2, 3 of the car are respectively connected to the fixed contacts 22, 24 of the switch 1. The rear turn-indicator lights 4, 5 are connected to the contacts 21, 23 respectively, in parallel circuits with pilot lights 7, 8. The contact 20 is connected to a flasher unit 9 which is a staple article of commerce and periodically interrupts current flowing therethrough.

The flasher unit 9 is connected to a battery 12 through a fuse 11 and an ignition lock switch 10 in the usual manner, the switch 10 also being connected to the contact 26. The ignition system generally indicated at 13 is connected to the contact 25.

A turn-indicator switch 6 mounted on the dashboard or the steering column of the car in a conventional manner has a handle 16 and is connected to the flasher unit 9 and the rear turn-indicator lights 4, 5 in such a manner that the light 4 or the light 5 is connected to the flasher unit 9 when the handle 16 is swung clockwise or counterclockwise respectively from the illustrated neutral position, as is conventional.

The circuit shown in FIG. 3 is controlled by the switch 1 in the following manner:

When the switch 1 is in the position shown in FIG. 1, the front and rear indicating lights on each side of the car are connected in parallel circuits by the connected contacts 22, 23 and 21, 24 respectively, and the connected contacts 25, 26 provide a conductive path from the ignition lock switch 10 to the ignition system 13. The car can be operated normally and the front and rear lights on one side of the car are flashed when the handle 16 is pivoted from the indicated position.

When the switch 1 is in the position shown in FIG. 2, the conductively connected contacts 20, 21, 23 simultaneously connect the rear turn indicator lights 4 and 5 and the associated pilot lights 7, 8 to the flasher unit 9. The front turn indicator lights 2, 3 are shut off from the battery 12 by the insulated contacts 22, 24, and the ignition circuit is interrupted between the contacts 25 and 26. The rear lights are flashed continuously, and the engine cannot be started by accident or negligence until the flashing lights are turned off.

When it is desired briefly to operate the engine without discontinuing the emergency signal delivered by the flashing rear turn-indicator lights 4, 5, the knob 27 is axially depressed, thereby conductively connecting the contacts 25, 26 without changing the disposition of the circuits associated with the contacts 21, 24. The ignition is shut off by the spring 37 when the knob 27 is released.

The circuit and switch described above permit a driver to actuate the flashing rear signal lights 4, 5 by turning the knob 27 as soon as a breakdown of any part of the vehicle makes it necessary to stop, but the engine can be kept running by holding the knob 27 depressed until the vehicle can reach a road shoulder or other safe area. When the knob is thereafter released, the engine is shut off, but the lights 4, 5 continue flashing.

After repairs are made, and it is desired to test the engine, it can be run again without loss of protection by the flashing lights when the knob 27 is depressed. Similarly, this protection is available while the engine is started for continuation of the trip, and while the vehicle is moved back into a normal traffic lane.

The circuit illustrated in FIG. 3 is readily installed by modification of existing turn-indicator systems even if their flasher units do not have sufficient capacity for simultaneously flashing four signal lights. It makes very economical use of available battery current and may be operated for an extended period without exhausting the battery. If the flasher unit is capable of handling four lights, the illustrated circuit is readily modified for such operation by permanently connecting the contacts 22, 23 and 21, 24 of the switch 1, or by using a switch which has only five contacts instead of the seven contacts shown in the drawing. The lights 2 to 5 shown in FIG. 3 may be constituted by separate filaments in the usual parking lights in a vehicle, by separate lamps assembled in a common unit with the parking lights, or by separate signal light assemblies.

What we claim is:

1. A circuit for generating a visible emergency signal on a vehicle and the like having an ignition system and a source of electric current, said circuit comprising, in combination:

a selector switch having at least five fixed contacts, a first if said contacts being connected to said source;

a flasher means conductively interposed between said source and a second of said contacts;

two signal lights respectively connected to third and fourth of said contacts of said selector switch; and conductive means for connecting the fifth of said contacts to the ignition system of the vehicle, said selector switch including a control member movable between three positions, and contact means operatively connected to said control member and engageable with said contacts for selectively connecting said first and fifth contacts in a first position of said control member, for selectively connecting said second, third, and fourth contacts in a second position of said control member, and for connecting said first and fifth contacts in the third position of the control member while maintaining the connection between said second, third and fourth contacts; and yieldably resilient means permanently urging said control member from said third position toward said second position thereof.

2. A circuit as set forth in claim 1, further comprising two additional signal lights, said selector switch including a sixth and seventh contact respectively connected to said additional signal lights, said contact means in said first position of said control member connecting said third and seventh contacts to each other and connecting said fourth and sixth contacts to each other; and a double throw switch connected to said flasher means and to each of said first-mentioned signal lights and manually operable for alternatively connecting each of said first-mentioned signal lights to said flasher means.

3. A circuit as set forth in claim 1, wherein said selector switch includes a casing, and guide means guiding said control member relative to said casing for angular movement about an axis between said first and second positions thereof, and for axial movement between said second and third positions thereof.

4. A circuit as set forth in claim 3, wherein said contact means include two switch members rotatable in said casing about said axis, one of said switch members being connected to said control member for joint angular and axial movement, coupling means connecting said one switch member to the other switch member for joint angular movement while permitting relative axial movement of said switch members, means for securing said other switch member against axial movement while said control member moves between said second and third positions thereof, and conductor means on each of said switch members and engageable with said contacts for selectively connecting the same in the three positions of the control member.

5. A selector switch comprising, in combination:
(a) seven fixed contacts including a first, second, third, fourth, fifth, sixth, and seventh fixed contact;
(b) a control member movable between three positions;

(c) contact means operatively connected to said control member and engageable with said fixed contacts
  (1) for selectively connecting to each other said first and fifth fixed contacts, said third and seventh fixed contacts, and said fourth and sixth fixed contacts in a first position of said control member,
  (2) for selectively connecting said second, third, and fourth fixed contacts in a second position of said control member, and
  (3) for connecting said first and fifth fixed contacts in the third position of said control member while maintaining the connection of said second, third, and fourth fixed contacts; and
(d) yieldably resilient means permanently urging said control member from said third position toward said second position thereof.

6. A switch as set forth in claim 5, further comprising a casing, and guide means guiding said control member relative to said casing for angular movement about an axis between said first and second positions thereof, and for axial movement between said second and third positions thereof, said contacts being fixedly mounted on said casing.

7. A switch as set forth in claim 6, wherein said contact means include two switch members rotatable in said casing about said axis, one of said switch members being connected to said control member for joint angular and axial movement, coupling means connecting said one switch member to the other switch member for joint angular movement while permitting relative axial movement of said switch members, means for securing said other switch member against axial movement while said control member moves between said second and third positions thereof, and conductor means on each of said switch members and engageable with said contacts for selectively connecting the same in the three positions of the control member.

References Cited

UNITED STATES PATENTS

| 1,910,069 | 5/1933 | Soreng | 200—4 |
| 1,923,310 | 8/1933 | Hippold | 340—64 |
| 2,590,658 | 3/1952 | Silvius | 200—4 |
| 2,652,553 | 9/1953 | Hollins. | |
| 1,549,524 | 8/1925 | Collier. | |
| 2,231,598 | 2/1941 | Schroyer | 200—4 |

THOMAS B. HABECKER, Primary Examiner

K. N. LEIMER, Assistant Examiner

U.S. Cl. X.R.

200—4